(12) United States Patent
Walsh

(10) Patent No.: US 7,544,742 B2
(45) Date of Patent: Jun. 9, 2009

(54) ANTISTATIC POLYAMIDE COMPOSITION AND ARTICLES THEREWITH

(75) Inventor: David J. Walsh, Chadds Ford, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 152 days.

(21) Appl. No.: 11/606,558

(22) Filed: Nov. 30, 2006

(65) Prior Publication Data

US 2008/0131713 A1  Jun. 5, 2008

(51) Int. Cl.
*C08G 73/02* (2006.01)
*C09D 5/18* (2006.01)

(52) U.S. Cl. .................. 525/185; 264/211.12; 428/411; 428/412; 428/423.5; 428/474.4; 428/474.9; 428/475.5; 428/475.8; 428/476.1; 524/387

(58) Field of Classification Search ................. 428/411, 428/412, 423.5, 474.4, 474.9, 475.5, 475.8, 428/476.1; 525/185; 264/211.12; 524/387
See application file for complete search history.

(56) References Cited

U.S. PATENT DOCUMENTS 7,090,926 B2 *  8/2006  Th. Vollenberg et al. . 428/475.5

FOREIGN PATENT DOCUMENTS

| WO | 98/08901 | 3/1998 |
|---|---|---|
| WO | 2004-050362 A1 | 6/2004 |
| WO | WO 2005075556 A | 8/2005 |

OTHER PUBLICATIONS

Abstract for JP 11077928, Mar. 23, 1999, Mitsui Du Pont Polychemical.
PCT International Search Report for International application No. PCT/US2007/024512, dated April 9, 2008.
DuPont® Entira AS polymer modifier; Internet Publication 05-00-2006.
DuPont announces Entira AS anti-static additive for thermoplastic resins; Internet Publication May 10, 2006.

* cited by examiner

*Primary Examiner*—Terressa M Boykin

(57) ABSTRACT

Disclosed are polyamide potassium ionomer polyol compositions that have antistatic properties. Also disclosed are articles, including laminates and monolayer or multilayer structures comprising such compositions to which neither powders nor dusts easily adhere electrostatically.

20 Claims, No Drawings

ANTISTATIC POLYAMIDE COMPOSITION AND ARTICLES THEREWITH

This invention relates to an antistatic polyamide polymer composition comprising a polyol and an ethylene acid copolymer ionomer neutralized with potassium, a process therefor, and an article therewith.

BACKGROUND OF THE INVENTION

Generally, a fabricated article made from a polymeric material can become statically charged, and the surface can attract and hold charged particles such as dust in the air. In some cases an article can become damaged and/or otherwise devalued by the adhesion of electrostatically charged species. In other cases, such as in the packaging of powders, the powder can adhere to the packaging material. For preventing adhesion of charged particles, various approaches for preventing surface static charge buildup have been proposed and put into practical use. Antistatic agents can be incorporated into the composition of a molded article or an antistatic agent can be applied to the surface of an article as a way of preventing build-up of static charge on an article. Use of antistatic agents is not trouble-free. Materials that come in contact with the composition can become contaminated due to bleeding of the antistatic agent out of the composition and/or the antistatic effect can deteriorate with time. Permanent, non-diffusing antistatic agents avoid many of these problems.

Some types of antistatic agents do not function as well at low relative humidity. In these cases, a humectant, a substance that promotes the retention of moisture, may be used. A common polyol used as a humectant is glycerol, due to its low viscosity and ease of incorporation. See, e.g., JP H10-193495A, JP H11-077928, JP H08-134295, JP H10-060185, and JP H10-060186. However, due to its volatility it can cause problems of smoking during processing and/or formation of deposits.

SUMMARY OF THE INVENTION

The invention provides composition comprising an electrostatic dissipative blend wherein the blend comprises or is produced from (i) about 40 to about 84 (or 80) weight % of a polyamide polymer; (ii) greater than 15 to about 59 weight % of a potassium ionomer; and (iii) greater than 1 to about 10 weight % of one or more polyol;

the ionomer comprises at least one E/X/Y copolymer where E is ethylene, X is a $C_3$ to $C_8$ $\alpha,\beta$ ethylenically unsaturated carboxylic acid, and Y is a softening comonomer selected from alkyl acrylate and alkyl methacrylate; the alkyl group of the comonomer has 1 to 8 carbon atoms; X is about 2-30 weight % of the E/X/Y copolymer and Y is from 0 to about 40 weight % of the E/X/Y copolymer; and the carboxylic acid functionalities are at least partially neutralized by potassium; and the polyol has at least three hydroxyl moieties.

The invention also provides an article, such as a film, sheet, multilayer laminate or molded part comprising the composition above.

The invention also provides a process comprising adding the polyol as a solution in water to a potassium ionomer in an extruder or other mixing equipment; removing the water; to produce a potassium ionomer-polyol mixture; and further comprising processing the potassium ionomer-polyol mixture into pellets, optionally further comprising dry blending the pellets of the potassium ionomer-polyol mixture with pellets of polyamide to form a polyamide-potassium ionomer-polyol mixture and processing the mixture into a finished article.

DETAILED DESCRIPTION OF THE INVENTION

All references disclosed herein are incorporated by reference.

Unless stated otherwise, all percentages, parts, ratios, etc., are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present).

The composition can comprise or be an antistatic blend of a polyamide with an acid copolymer ionomer at least partially neutralized with potassium and a polyol. For example, the composition exhibits a surface resistivity of less than $1 \times 10^{12}$ ohm/sq (preferably less than $1 \times 10^{11}$) (measured at 23° C.) at 50% relative humidity (RH) and/or less than $1 \times 10^{13}$ ohm/sq (preferably less than $1 \times 10^{12}$) at 30% RH. The blend may have particles of potassium ionomer-polyol dispersed in polyamide, preferably with a weight average particle diameter of greater than 0.1 microns.

The compositions exhibit greatly improved antistatic performance, especially at low relative humidity, but even at high relative humidity. At high RH, one expects that a humectant may not be necessary to achieve less than $10^{12}$ ohm/sq resistivity. For a 2-phase material such as the composition disclosed herein, resistivity depends on the composition's morphology, which is process related.

The blend provides improved antistatic properties when the blend is not well mixed. When polyamide is modified with potassium ionomers at lower loadings (for example, 20 weight % potassium ionomer) and for fully compounded blends, good performance at 50% RH is only found in the presence of the polyol.

Polyamide, also referred to as "nylon", etc., are inclusive of not only polymers comprising repeat units derived from monomers known to polymerize to form a polymer of the named type, but are also inclusive of comonomers, derivatives, etc. which can copolymerize with monomers known to polymerize to produce the named polymer. For example, "polyamide" encompasses both polymers comprising repeat units derived from monomers, such as caprolactam, which polymerize to form a polyamide, as well as copolymers derived from the copolymerization of caprolactam with a comonomer that when polymerized alone does not result in the formation of a polyamide. Furthermore, terms identifying polymers are also inclusive of blends of such polymers with other polymers of a different type.

Polyamides used in the blend are well known to those skilled in the art. Polyamides suitable for use are generally prepared from lactams or amino acids (e.g. nylon 6 or nylon 11), or prepared from condensation of diamines such as hexamethylene diamine with dibasic acids such as succinic, adipic, or sebacic acid. Copolymers and terpolymers of these polyamides are also included. The polyamide in the blend can include one or more polyepsiloncaprolactam (nylon 6), nylon 9, nylon 10, nylon 11, nylon 12, polyhexamethylene adipamide (nylon 6,6), nylon 6,10, nylon 6,12, nylon 6I, nylon 6T, nylon 6.9, nylon 12,12, copolymers (such as nylon 6/6,6; nylon 6,10; nylon 6,12; nylon 6,6/12; nylon 6/6,6/6,10 and nylon 6/6T), blends of amorphous and semicrystalline polyamides, or combinations of two or more thereof. Polyamide also includes polyamide nano-composites such as those available commercially under the tradename AEGIS from Honeywell or IMPERM (MXD6) from Mitsubishi Gas Chemicals/Nanocor. Frequently used polyamides are nylon 6, nylon 6,6, or combinations thereof and most frequently used is nylon 6.

The polyamide comprises from about 40 to about 84 (or 80) weight percent (or about 60 to 80, or about 60 to 75 percent) of the blend.

Acid copolymer ionomers ("ionomers") are ionic copolymers formed from an olefin such as ethylene and the carboxylate salt of an unsaturated carboxylic acid, such as acrylic acid, methacrylic acid, maleic acid, or combinations of two or more thereof and optionally one or more softening comonomers, wherein at least some of the carboxylic acid moieties in the copolymer are neutralized to form the corresponding carboxylate salts. A softening comonomer can include an alkyl (meth)acrylate providing "softer" resins which can be neutralized to form softer ionomers.

An ionomer can comprise at least one E/X/Y or E/X (if Y=0%) copolymer as disclosed above.

Potassium compounds for neutralizing the acid copolymer can include compounds of potassium, optionally small amounts (such as less than 5 or 1 or 0.1%) of other cations such as other alkali metal (for example, lithium or sodium) ions, transition metal ions or alkaline earth ions and mixtures or combinations of such cations. Potassium compounds of note include formates, acetates, nitrates, carbonates, hydrogencarbonates, oxides, hydroxides or alkoxides of the ions of potassium and other alkali metals, and formates, acetates, nitrates, oxides, hydroxides or alkoxides of the ions of alkaline earth metals and transition metals. Of particular note are potassium hydroxide, potassium acetate, potassium carbonate, or combinations of two or more thereof.

Preferably, about 15 to about 90%, preferably about 50 to about 90% of the acid moieties of the acid copolymer are nominally neutralized by potassium cations, or a combination of potassium and one or more alkali metal, transition metal, or alkaline earth metal cations, such as lithium, sodium, magnesium, calcium, or zinc, wherein potassium comprises a preponderance of the cations.

Suitable ionomers are known and commercially available from E. I. du Pont de Nemours and Company, Wilmington, Del., USA (DuPont).

The blend can include from about 20 to about 59% of the potassium ionomer, preferably up to about 40 or 35%. A mixture of two or more different acid copolymers can be used in the ionomer composition in place of a single copolymer. Particularly useful properties may be obtained when two or more properly selected acid copolymers are used.

A polyol having at least three hydroxyl moieties can be included in the composition at about 1% of polyol up to about 10 (or about 5) or at about 1.5%.

The composition can comprise a polyol other than glycerol. Such polyol does not have the problems associated with the volatility of glycerol. The polyols can have low volatility, such as diglycerol, hexanetriol, pentaerythritol, polyglycerol, sorbitol, or combinations of two or more thereof. Preferably the polyols have at least 4 hydroxyl moieties. More preferably is the use of diglycerol, which can be mixed with as little as 10% water to produce a mixture of low enough viscosity to easily incorporate into the ionomer.

Diglycerol (or diglycerin) is the common name for the condensed dimer of glycerol. Condensation processes can lead to diglycerol with relatively high levels of impurities, including glycerol.

Diglycerol is also made via the reaction of epichlorohydrin with glycerol and epoxide ring-opening, which can provide products of higher purity. Diglycerol prepared in this manner is commercially available from Solvay as a mixture of predominately $\alpha,\alpha'$-diglycerol [4-oxa-1,2,6,7-hepatanetriol], for example more than 80%, $\alpha,\beta$-diglycerol [$HOCH_2CHOHCH_2OCH(CH_2OH)_2$], for example about 10-15%, and $\beta,\beta'$-diglycerol [$(HOCH_2)_2CHOCH(CH_2OH)_2$] for example, less than 1%.

A diglycerol that has a low amount of glycerol, unlike traditional materials that generally contain at least 10% glycerol, can also be used. Of particular note is a diglycerol composition having low glycerol content (less than 7 or less than 5 weight % glycerol), which is commercially available from Solvay.

The antistatic composition can be prepared by blending the polyamide, potassium ionomer and polyol, such as diglycerol, so that they are homogeneously dispersed to the naked eye and do not delaminate upon extrusion. Other materials (e.g. additives or other polymers as described below) may be also uniformly dispersed in the polyamide-potassium ionomer-polyol matrix. The blend may be obtained by combining the component materials using any melt-mixing method known in the art. For example: 1) the component materials may be mixed using a melt-mixer such as a single or twin-screw extruder, blender, kneader, Banbury mixer, roll mixer, etc., to give the antistatic composition; or 2) a portion of the component materials can be mixed in a melt-mixer, and the rest of the component materials subsequently added and further melt-mixed. Preferably the potassium ionomer and the polyol are combined, subsequently dry blended with the polyamide polymer and processed directly into a finished article through, for example, extrusion molding, coextrusion molding, extrusion lamination, extrusion coating, cast film extrusion, blown film extrusion or the like.

Of note is a process comprising adding the polyol as a solution in water to a potassium ionomer in an extruder or other mixing equipment; and removing the water (for example, by evaporation such as from a vacuum port on an extruder) to produce a potassium ionomer-polyol mixture; processing the potassium ionomer-polyol mixture into pellets; and optionally dry blending the pellets of the potassium ionomer-polyol mixture with pellets of polyamide to form a polyamide-potassium ionomer-polyol mixture and processing the mixture into a finished product.

A composition so prepared, when observed under electron microscopy, may show particles of the potassium ionomer and/or polyol dispersed in a polyamide matrix. For example, the blend has a preponderance of the potassium ionomer-polyol material in particles ranging from about 0.2 microns up to about 1.5 microns, or higher such as at least 0.25 microns. The particle size distribution can also be described using a weight average particle diameter. A weight average particle diameter is an appropriate measure of particle size, since a number average diameter can be skewed lower by the presence of a large number of very small particles, which make up only a small portion of the material. The weight average can be calculated according to the formula below, where $w_1$ is the weight of the particles (proportional to the volume or $d_1^3$) having a diameter $d_1$.

$$\frac{\sum w_i d_i}{\sum w_i}$$

Preferred are compositions wherein particles of potassium ionomer-polyol are dispersed in polyamide, wherein the particles have a weight average particle diameter of greater than 0.1 micron.

These compositions can exhibit improved charge dissipation over compositions in which the components are more highly dispersed such as those disclosed in JP H10-060186, which require thorough mixing (as evidenced by the high maximum apparent shear rates used) to produce practical antistatic properties.

Without being held to any particular theory, it appears that larger particles of potassium ionomer and/or polyol provide a better network of charge-carrying regions than smaller particles. Dry blending of the components may be advantageous by forming asymmetric or extended particles. Such particles may contribute to a more effective charge-carrying network.

The antistatic compositions may comprise other thermoplastic polymers or other optional components, that can be excluded. Compositions described herein can have other desirable properties that can be negatively affected by blending the antistatic composition with other polymeric components. For example, moisture and gas permeability of a film of sheet may be affected in such a blend.

Optional polymeric components that can be blended with the antistatic composition include non-ionic thermoplastic resins. The non-ionic thermoplastic resins would, by way of non-limiting illustrative examples, include thermoplastic elastomers, such as polyurethanes, poly-ether-esters, poly-amide-ethers, polyether-ureas, PEBAX (a family of block copolymers based on polyether-block-amide, commercially supplied by Arkema); styrene-butadiene-styrene (SBS) block copolymers; styrene(ethylene-butylene)-styrene block copolymers; polyesters; polyvinyl alcohol; polyolefins including polyethylene, polypropylene, ethylene/propylene copolymers; ethylene copolymers with various comonomers, such as vinyl acetate, (meth)acrylates, (meth)acrylic acid, epoxy-functionalized monomer, CO, vinyl alcohol; functionalized polymers with maleic anhydride grafting, epoxidization; elastomers, such as EPDM, metallocene catalyzed PE and copolymer, and ground up powders of thermoset elastomers.

For example, other copolymers of ethylene and polar comonomers may also be included in the potassium ionomer composition. An ethylene copolymer of note is an ethylene/alkyl acrylate copolymer, including an ethylene/methyl acrylate copolymer.

Additives such as an antioxidant (e.g., hindered phenols characterized as phenolic compounds that contain sterically bulky radicals in close proximity to the phenolic hydroxyl group) can be used. Hindered phenols can include 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(8tert-butyl-o-cresol); 2,6-di-n-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; sorbitol hexa[3-(3,5di-tert-butyl-4-hydroxy-phenyl)-propionate], or combinations of two or more thereof.

The composition can be used in monolayer or multilayer structures having at least two layers to impart its antistatic properties, for example, in packaging applications such as films, containers, and lids.

When used in a packaging application, the multilayer may involve at least one of three categorical layers including, but not limited to, an outermost structural or abuse layer, a barrier layer, bulking layer and/or adhesive layer, and an innermost layer making contact with and compatible with the intended contents of the package and capable of forming the necessary seals (e.g. most preferably heat-sealable) to itself and the other parts of the package. Other layers may also be present to serve as adhesive or "tie" layers to help bond these layers together. Outermost and innermost refer to surface layers of the structure that are respectively furthest from or closest to the contents of the package.

The antistatic compositions can be used as a surface layer (a layer of which only one face of the layer contacts another layer; an outermost layer) of a multilayer structure. An antistatic laminate is a laminate comprising a layered structure comprising at least two layers, one of which comprises the antistatic composition; or comprising at least three layers wherein there are two surface layers and an intermediate layer (a layer of which both faces of the layer contact another layer) positioned between the two surface layers, and wherein at least one surface layer comprises the composition. A multilayer structure of note has two surface layers comprises the antistatic composition and at least one intermediate layer.

The antistatic composition can also be used as an intermediate layer of the multilayer laminate, in which the antistatic composition provides a "hidden" antistatic layer. An example is a multilayer structure comprising at least three layers wherein there are two surface layers and an intermediate layer positioned between the two surface layers, and wherein the intermediate layer comprises the composition.

A polymeric material having a surface resistivity of $1 \times 10^{14}$ ohm/sq (measured at 23° C. under an atmosphere of 50% relative humidity) or more can be used for a surface layer or an intermediate layer. Examples thereof include homopolymers of ethylene; copolymers of ethylene and an α-olefin having from 3 to 12 carbon atoms, e.g., high pressure process polyethylene, medium or high density polyethylene, linear low density polyethylene, especially linear low density polyethylene having a density of 940 kg/m$^3$ or less and very low density polyethylene; polypropylene; poly-1-butene; poly-4-methyl-1-pentene; copolymers of ethylene and a polar monomer, for example, an ethylene-vinyl acetate copolymer, copolymers of ethylene and unsaturated carboxylic acid, e.g., acrylic acid, methacrylic acid, monoethyl maleate, maleic anhydride, etc. or their ionomers of Na, Li, K, Zn, Mg, Ca or the like; copolymers of ethylene and at least one kind of unsaturated carboxylic acid ester, for example, methyl acrylate, ethyl acrylate, isobutyl acrylate, n-butyl acrylate, 2-ethylhexyl acrylate, methyl methacrylate, glycidyl methacrylate, dimethyl maleate; copolymers of ethylene and an unsaturated carboxylic acid and unsaturated carboxylic acid ester such as those mentioned previously, or ionomers of Na, Li, K, Zn, Mg, Ca or the like; copolymers of ethylene, carbon monoxide and, optionally, an unsaturated carboxylic acid ester or vinyl acetate; olefin-based polymers such as polyolefin elastomers; styrene-based polymers such as rubber-reinforced styrene-based resins, for example, polystyrene, high impact polystyrene, ABS resin, etc.; polyesters such as polyethylene terephthalate, polytrimethylene terephthalate, polytetramethylene terephthalate, polyethylene naphthalate, cyclohexanedimethanol-copolymerized polyethylene terephthalate, and polyester elastomers; polycarbonates; polymethyl methacrylate; or mixtures of two or more of them.

An ethylene-based polymer that can be used as either a surface layer or an intermediate layer can be an ethylene homopolymer or a copolymer of ethylene and α-olefin having three or more (preferably from 3 to 12) carbon atoms that is manufactured in the presence of a metallocene catalyst (see for example U.S. Pat. Nos. 5,198,401 and 5,405,922).

Examples of the α-olefin having three or more carbon atoms in the aforementioned ethylene copolymer include propylene, 1-butene, 1-pentene, 1-hexene, 1-octene, 1-decene, 1-dodecene, 4-methyl-1-pentene, etc. In particular, a copolymer of ethylene and an α-olefin having from 3 to 12 carbon atoms is preferably used. More than one α-olefin may be present in a mixture that can be copolymerized with ethylene.

A structure where another polymeric material layer or an adhesive layer is formed between at least one of the surface layers and the intermediate layer is contemplated herein. Although such a polymeric material layer may be a layer made of a polymeric material as the surface layer, it is optionally a recovery layer in which recovered wastes such as off-specification products or selvages formed during the production of laminates are used. The material of such a recovery layer can be the same as the material of the surface layer, the intermediate layer or a mixture of these materials.

An adhesive layer can be formed between a surface layer and an intermediate layer and may be any that is capable of improving the adhesion between the surface layer and the intermediate layer. It can be selected from thermoplastic polymers such as those listed above and also may be a hot melt adhesive or application-type adhesives. It can be preferable to use an adhesive capable of being extrusion coated or coextruded selected from thermoplastic polymers and compositions comprising such thermoplastic polymers and tackifiers or the like incorporated thereto.

Anhydride or acid modified ethylene and propylene homo- and co-polymers are used as extrudable adhesive layers (tie layers) to improve bonding of layers of polymers together when the polymers do not adhere well to each other, thus improving the layer-to-layer adhesion in a multilayer structure. The compositions of the tie layers may be determined according to the compositions of the adjoining layers to be bonded in the multilayer structure. Various tie layer compositions are commercially available from DuPont.

Individual layers can incorporate various additives as needed, examples of which include antioxidants, light stabilizers, ultraviolet absorbers, pigments, dyes, lubricants, antiblocking agents, inorganic fillers, foaming agents, etc. For example, it is possible to incorporate an organic or inorganic chemical foaming agent such as azodicarbonamide, dinitrosopentamethylenediamine, sulfonylhydrazide, sodium bicarbonate and ammonium bicarbonate at a ratio of from about 0.1 to about 10 parts by weight per 100 parts by weight of the polymer component constituting a layer.

A laminate film can be prepared by coextrusion as follows. Granulates of the various components are melted in suitable extruders and converted into a film using a converting technique. For coextrusion, the molten polymers are passed through a die or set of dies to form layers of molten polymers that are processed as a laminar flow and then cooled to form a layered structure. A laminate or multilayer structure may also be made by coextrusion followed by lamination onto one or more other layers. Suitable converting techniques include blown film extrusion, cast film extrusion, cast sheet extrusion, extrusion coating and blow molding.

Besides wrapping materials, the laminate can be used for various applications such as base materials of dicing tapes; adhesive tapes or films for semiconductors such as backgrinding films; electric and electronic materials such as marking films, integrated circuit carrier tapes and tapes for taping electronic components; materials for wrapping foods; medical supplies; protection films (e.g., guard films or sheets for boards and lens of glass, plastics or metal); steel-wire covering materials; cleanroom curtains; wallpapers; mats; flooring materials; inner bags of flexible containers; containers; shoes; battery separators; moisture permeable films; antifouling films; dust-proofing films; PVC-free films; tubes, bottles and the like for packing cosmetics, detergents, shampoo, rinse, etc.

Laminates that are excellent in charge decay are capable of preventing dusts and powders from adhering thereto due to charging and consequently are excellent in antifouling properties. Such laminates can be used in the form of a film, a tape, a sheet, a tube, a pipe, a bag, a multilayer container (for example, a container made by blow molding), a rod, various injection-molded articles, various blow-molded articles, etc. Preferred is a laminate in the form of a film, a sheet, a bag or a multilayer container. A molded article having a surface layer with the decay characteristic, the surface layer forming an outer surface of the article, can be excellent in antifouling property and can avoid soiling of the surface. When the laminate is used as a wrapping material of a powder where it is used in such a manner that the surface layer with the decay characteristic is an inner surface layer, powder electrostatically adhered to the wrapping material can be avoid such that their commodity value is not deteriorated.

A multilayer blown container can comprise a laminate having as an intermediate or surface layer a layer comprising the antistatic composition. Such multilayer blown container may have an outer surface excellent in slipping property, scratch resistance and antifouling property.

The following Examples are merely illustrative, and not limiting of the disclosure in any way whatsoever. The methods for the evaluation of the raw materials used and the antistatic performances of the resulting laminates in the following Examples and Comparative Examples are shown below.

EXAMPLES

Materials Used

PA-1: A nylon 6 having a viscosity in sulfuric acid of 150 cm$^3$/g measured according to ISO 307, available from BASF as ULTRAMID B3.

KI-1 was a potassium ionomer, composed of a mixture of ethylene/methacrylic acid copolymers and an ethylene/methyl acrylate copolymer having an overall composition of 14.9% methacrylic acid and 0.9% methyl acrylate. The combined acid moieties present are nominally neutralized to 84.8% with potassium and the MFR is 1.95.

KI-DG was KI-1 to which was added 8% by weight of diglycerol. The diglycerol was a grade that had very low glycerol content, which reduces smoking in the final product during processing.

The surface resistivity test was conducted in compliance with the ASTM D-257 method. Samples were acclimatized for at least 24 hours in a humidity controlled chamber. The surface resistivity of the compositions was measured and reported (the average of at least three replicates per composition) in Tables 1 through 3, as ohms/square. For an idea of the amount of variability to be expected in a test of this kind, the observed scatter in resistivity in a recent ANSI study was about half an order of magnitude sample to sample. In the tables, "E^x", where x is an integer, is shorthand notation for "times 10^x."

Examples 1 and 2

Using a 30 mm W&P twin-screw extruder, PA-1 was mixed with KI-1, to give the compositions of Comparative Examples C1 and C2, or KI-DG, to give the compositions of Examples 1 and 2, as summarized in Table 1. The compositions were collected as pellets. Mixing in this manner provides compositions in which the components are well-blended. The compositions were then molded into plaques, 3 inch by 3 inch by 1/16$^{th}$ inch thick were molded on a 1.5 oz Arberg injection molding machine. The injection molding machine has a relatively short single-screw extruder feed that provides only limited mixing prior to molding. The antistatic properties are shown in Table 1.

TABLE 1

| | Example | | | |
|---|---|---|---|---|
| | C1 | C2 | 1 | 2 |
| PA-1, % | 80 | 70 | 80 | 70 |
| KI-1, % | 20 | 30 | — | — |
| KI-DG, % | — | — | 20 | 30 |
| Resistivity at 50% RH ohms/sq | 1.47E^12 | 6.46E^9 | 4.93E^10 | 2.41E^9 |
| Resistivity at 30% RH ohms/sq | 3.24E^14 | 9.85E^13 | 6.78E^12 | 3.10E^11 |
| Resistivity at 15% RH ohms/sq | 1.62E^15 | 2.20E^15 | 7.82E^14 | 7.59E^13 |

The Examples 1 and 2, with diglycerol, show improved resistivity (up to about 2 orders of magnitude), compared to the corresponding Comparative Examples C1 and C2, without diglycerol.

Examination of samples of these blends under electron microscopy showed that these blends had generally circular particles of ionomer in the polyamide matrix. Comparative Examples C1 and C2 had particles with diameters up to about 0.2 microns, while Examples 1 and 2 had particles with diameters up to about 0.3 microns.

Examples 3 and 4

Mixtures of PA-1 with the KI-1 and KI-DG were mixed as dry blends and molded directly into plaques on the 1.5 oz Arberg injection molding machine. The compositions and properties are shown in Table 2. Because the compositions were processed only in an extruder that provides limited mixing, the components of the compositions in Table 2 were not well-blended.

TABLE 2

| | Example | | | |
|---|---|---|---|---|
| | C3 | C4 | 3 | 4 |
| PA-1, % | 80 | 70 | 80 | 70 |
| KI-1, % | 20 | 30 | — | — |
| KI-DG, % | — | — | 20 | 30 |
| Resistivity at 50% RH ohms/sq | 6.45E^9 | 3.90E^9 | 3.65E^9 | 4.71E^8 |
| Resistivity at 30% RH ohms/sq | 1.40E^14 | 8.65E^13 | 7.24E^11 | 5.03E^10 |
| Resistivity at 15% RH ohms/sq | 1.77E^16 | 1.49E^16 | 1.64E^14 | 7.82E^12 |

Similar to the results summarized in Table 1, Examples 3 and 4, with diglycerol, show improved resistivity (up to over 3 orders of magnitude) compared to the corresponding Comparative Examples without diglycerol. Examples 3 and 4 also show improved resistivity over Examples 1 and 2 (about 1 order of magnitude), indicating that dry blending may provide a more efficient network for charge dissipation. Comparative Examples C3 and C4 did not exhibit similar improvement from dry blending when compared to Comparative Examples C1 and C2.

Electron microscopy showed that these blends had generally circular particles and elongated particles or strands of ionomer in the polyamide matrix. The long axis of the strands was generally parallel to the machine direction of the molding. Comparative Examples C3 and C4 had particles with diameters or thickness (for the strands) up to about 0.5 microns, while Examples 3 and 4 had particles with diameters or thickness up to about 1.2 microns. The strands in Examples 3 and 4 appeared to be generally longer than the strands in the Comparative Examples C3 and C4.

Comparative Examples C5 and C6

Comparative Examples were measured of the pure PA-1. This was done as-is and also after passing through the twin-screw extruder to remove possibility that extrusion affects the results. These results are shown in Table 3.

TABLE 3

| | Comparative Example | |
|---|---|---|
| | C5 | C6 |
| PA-1 | As-is | Extruded |
| Resistivity at 50% RH ohms/sq | 4.00E^14 | 3.31E^14 |
| Resistivity at 30% RH ohms/sq | 2.83E^15 | 2.66E^15 |
| Resistivity at 15% RH ohms/sq | 1.03E^16 | 2.34E^15 |

In these Comparative Examples, the effective currents are very small and anything over E^15 should be considered equivalent. We observed no major effects of extrusion on the resistivity of polyamides.

The conclusions from these Examples are that dry blends of the components are better than fully compounded mixtures, and that diglycerol improves performance, especially at low relative humidities, but even at high relative humidities. The combination of diglycerol and dry blending is particularly beneficial.

The invention claimed is:

1. A composition comprising an electrostatic dissipative blend wherein
    the blend comprises or is produced from (i) about 40 to about 84 weight % of a polyamide polymer; (ii) greater than 15 to about 59 weight % of a potassium ionomer; and (iii) greater than 1 to about 10 weight % of one or more polyol;
    the ionomer comprises at least one E/X/Y copolymer where E is ethylene, X is a $C_3$ to $C_8$ α,β ethylenically unsaturated carboxylic acid, and Y is a softening comonomer selected from alkyl acrylate and alkyl methacrylate; the alkyl group of the comonomer has 1 to 8 carbon atoms; X is about 2-30 weight % of the E/X/Y copolymer and Y is from 0 to about 40 weight % of the E/X/Y copolymer; and the carboxylic acid functionalities are at least partially neutralized by potassium; and the polyol has at least three hydroxyl moieties.

2. The composition of claim 1 wherein the blend has particles of potassium ionomer-polyol dispersed in the polyamide.

3. The composition of claim 2 wherein a preponderance of the potassium ionomer-polyol material is contained in particles ranging from about 0.2 microns up to about 1.5 microns.

4. The composition of claim 2 wherein the particles of potassium ionomer-polyol have a weight average particle diameter of greater than 0.1 microns.

5. The composition of claim 1 wherein the blend exhibits a surface resistivity of less than $1 \times 10^{12}$ ohm/sq measured at 23° C. and 50% relative humidity.

6. The composition of claim 1 wherein the blend comprises at least about 1.5 weight % of the polyol.

7. The composition of claim 1 wherein the polyol is not glycerol and includes diglycerol, hexanetriol, pentaerythritol, a polyglycerol, sorbitol, or combinations of two or more thereof.

8. The composition of claim 7 wherein the polyol comprises a diglycerol having less than 7 weight % glycerol.

9. The composition of claim 2 comprising a polyol having at least 4 hydroxyl moieties.

10. The composition of claim 1 wherein the potassium ionomer composition further comprises a non-ionic thermoplastic resin including a copolymer of ethylene and at least one polar comonomer.

11. The composition of claim 10 wherein the copolymer is an ethylene/alkyl acrylate copolymer, an ethylene/methyl acrylate copolymer, or combinations thereof.

12. The composition of claim 1 wherein the blend is a dry blend.

potassium ionomer composition and the polyol are combined, subsequently dry blended with the polyamide polymer and processed directly into a finished article through, for example, extrusion molding, coextrusion molding, extrusion lamination, extrusion coating, cast film extrusion, or blown film extrusion.

13. A process comprising combining a polyol having at least three hydroxyl moieties as a solution in water to a potassium ionomer in a mixing equipment including an extruder; removing the water thereby producing a potassium ionomer-polyol mixture; and processing the potassium ionomer-polyol mixture into pellets wherein the ionomer comprises at least one E/X/Y copolymer where E is ethylene, X is a $C_3$ to $C_8$ α,β ethylenically unsaturated carboxylic acid, and Y is a softening comonomer selected from alkyl acrylate and alkyl methacrylate; the alkyl group of the comonomer has 1 to 8 carbon atoms; X is about 2-30 weight % of the E/X/Y copolymer and Y is from 0 to about 40 weight % of the E/X/Y copolymer; and the carboxylic acid functionalities are at least partially neutralized by potassium.

14. The process of claim 13 comprising a polyol having at least 4 hydroxyl moieties.

15. The process of claim 13 further comprising dry blending the pellets with pellets of polyamide to form a polyamide-potassium ionomer-polyol mixture and processing the polyamide-potassium ionomer-polyol mixture into a finished article.

16. The process of claim 15 wherein the ionomer further comprises a non-ionic thermoplastic resin including an ethylene/alkyl acrylate copolymer, an ethylene/methyl acrylate copolymer, or combinations thereof.

17. An article comprising or produced from a composition wherein the article includes a monolayer film or sheet, multilayer film or sheet, multilayer laminate structure, molded part, or combinations of two or more thereof and the composition is as recited in claim 1.

18. The article of claim 17 wherein the article comprises two layers, one of which comprises the composition and the article is optionally a film or sheet used for wrapping.

19. The article of claim 18 comprising at least three layers including two surface layers and an intermediate layer positioned between the two surface layers wherein the at least one surface layer comprises the composition.

20. The article of claim 19 wherein the intermediate layer comprises the composition.

* * * * *